(12) United States Patent
Kim

(10) Patent No.: US 12,176,475 B2
(45) Date of Patent: Dec. 24, 2024

(54) APPARATUS FOR MANUFACTURING POUCH TYPE BATTERY

(71) Applicant: LG Energy Solution, Ltd., Seoul (KR)

(72) Inventor: Mina Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 216 days.

(21) Appl. No.: 17/788,951

(22) PCT Filed: Sep. 3, 2021

(86) PCT No.: PCT/KR2021/011912
§ 371 (c)(1),
(2) Date: Jun. 24, 2022

(87) PCT Pub. No.: WO2022/092541
PCT Pub. Date: May 5, 2022

(65) Prior Publication Data
US 2023/0343983 A1    Oct. 26, 2023

(30) Foreign Application Priority Data

Oct. 29, 2020    (KR) ........................ 10-2020-0141978

(51) Int. Cl.
*B32B 41/00*      (2006.01)
*H01M 10/04*     (2006.01)
(Continued)

(52) U.S. Cl.
CPC ..... *H01M 10/0404* (2013.01); *H01M 50/105* (2021.01); *H01M 50/188* (2021.01)

(58) Field of Classification Search
CPC ........... H01M 10/0404; H01M 50/105; H01M 50/188; H01M 2220/30; B29C 66/1122;
(Continued)

(56) References Cited

U.S. PATENT DOCUMENTS

| | | |
|---|---|---|
| 2002/0157242 A1 | 10/2002 | Fukuda et al. |
| 2012/0291512 A1 | 11/2012 | Kang et al. |
| 2018/0047950 A1 | 2/2018 | Lim et al. |

(Continued)

FOREIGN PATENT DOCUMENTS

| | | |
|---|---|---|
| CN | 107534098 A | 1/2018 |
| CN | 108140759 A | 6/2018 |

(Continued)

OTHER PUBLICATIONS

International Search Report for Application No. PCT/KR2021/011912 mailed Dec. 10, 2021, 2 pages.

(Continued)

*Primary Examiner* — Michael N Orlando
*Assistant Examiner* — Joshel Rivera
(74) *Attorney, Agent, or Firm* — Lerner David LLP

(57) ABSTRACT

A pouch type battery manufacturing apparatus according to an embodiment of the present disclosure is a secondary battery manufacturing apparatus for sealing a pouch type battery case, the apparatus including: an upper sealing tool and a lower sealing tool, wherein each of the upper sealing tool and the lower sealing tool is formed by assembling a plurality of sealing parts, wherein the plurality of sealing parts includes a central sealing part, a first sealing part located on the left and right sides of the central sealing part, and a second sealing part disposed outside the first sealing part, and wherein the central sealing part corresponds to an electrode lead covered by a lead film, and an upper surface and a lower surface of the central sealing part are parallel to each other.

12 Claims, 11 Drawing Sheets

(51) Int. Cl.
  *H01M 50/105* (2021.01)
  *H01M 50/188* (2021.01)

(58) Field of Classification Search
  CPC .............. B29C 66/1312; B29C 66/54; B29C
      66/81425; B29C 66/81431; B29C 66/71;
      B29C 66/72341; B29C 66/72343; B29C
      66/433; B29C 66/72321; B29C 66/7234;
      B29C 66/73921; B29C 66/81419; B29C
      65/02; B29C 66/81461; B29C 66/8167;
      B29C 66/83221; B29C 66/841; B29C
      66/81411; B29K 2705/02; B29K
      2067/003; B29K 2077/00; B29K 2023/12;
      B29L 2031/3468; B29L 2031/36; B29L
      2031/7146; Y02E 60/10; Y02P 70/50
  USPC .................. 156/60, 64, 350, 351, 378, 379
  See application file for complete search history.

(56) References Cited

U.S. PATENT DOCUMENTS

| | | |
|---|---|---|
| 2018/0062148 A1 | 3/2018 | Cho et al. |
| 2018/0261807 A1 | 9/2018 | Lim |

FOREIGN PATENT DOCUMENTS

| | | |
|---|---|---|
| EP | 3896755 A1 | 10/2021 |
| JP | H07-39604 Y | 9/1995 |
| JP | 2001229889 A | 8/2001 |
| JP | 2001-297738 A | 10/2001 |
| JP | 2004-111303 A | 4/2004 |
| JP | 2005-353503 A | 12/2005 |
| JP | 2007242548 A | 9/2007 |
| KR | 20010110686 A | 12/2001 |
| KR | 20110075724 A | 7/2011 |
| KR | 20160096417 A | 8/2016 |
| KR | 101670507 B1 | 10/2016 |
| KR | 20160118931 A | 10/2016 |
| KR | 101672402 B1 | 11/2016 |
| KR | 20160133041 A | 11/2016 |
| KR | 20190127120 A | 11/2019 |
| KR | 20200114410 A | 10/2020 |
| WO | 2014-188774 A1 | 11/2014 |

OTHER PUBLICATIONS

Extended European Search Report for Application No. 21886538.4 dated May 19, 2023. 6 pgs.

[FIG. 1]
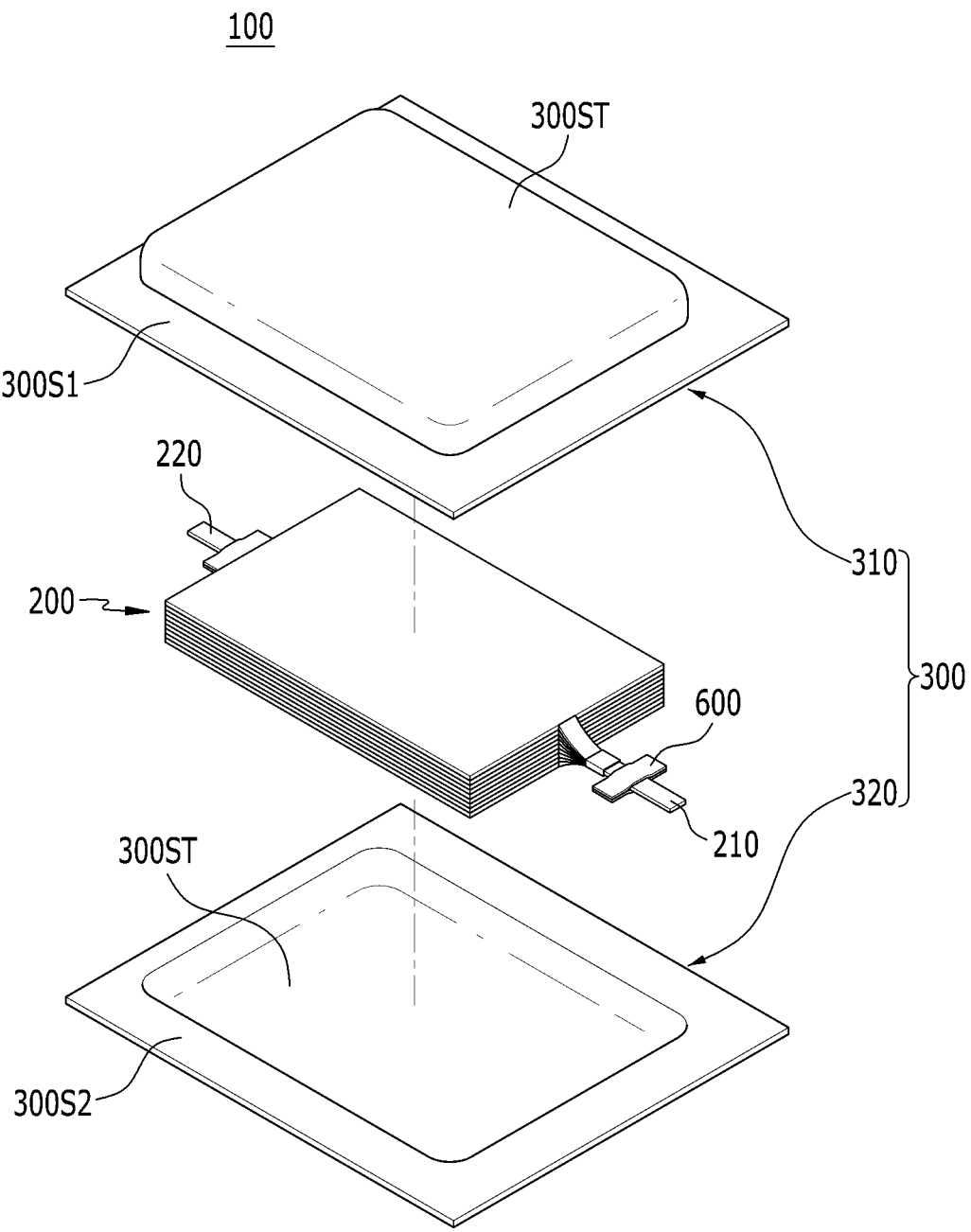

[FIG. 2]
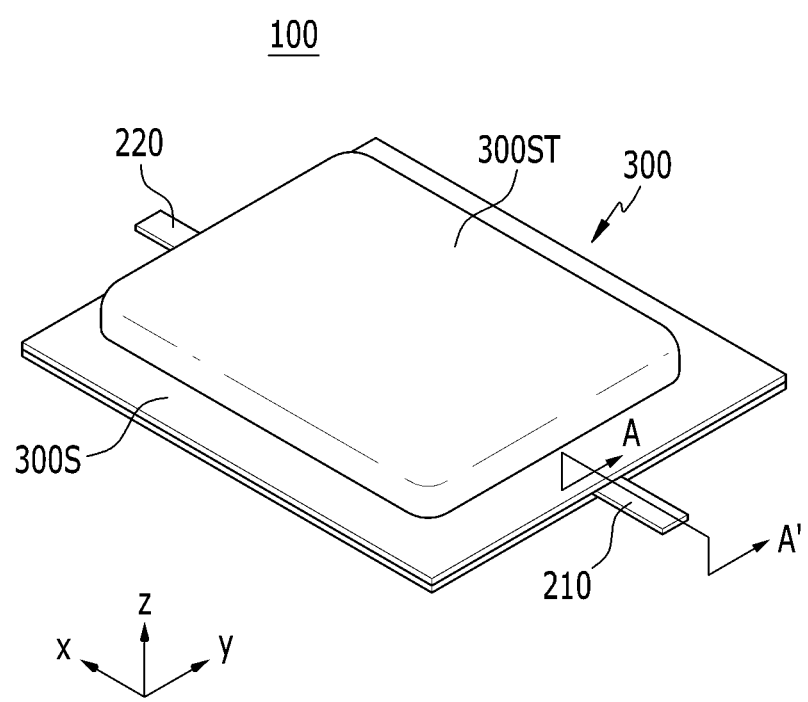

[FIG. 3]
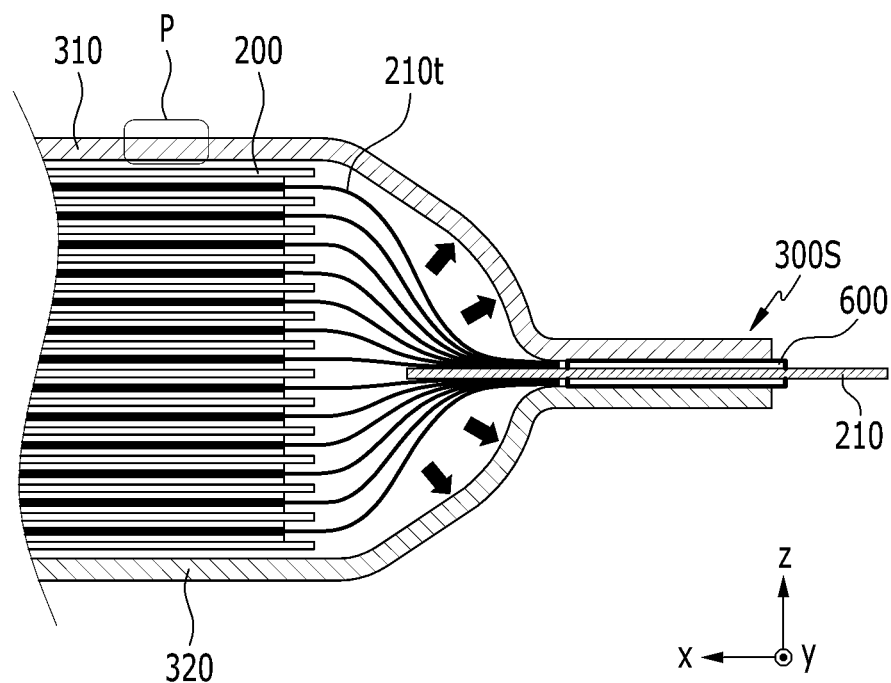

[FIG. 4]
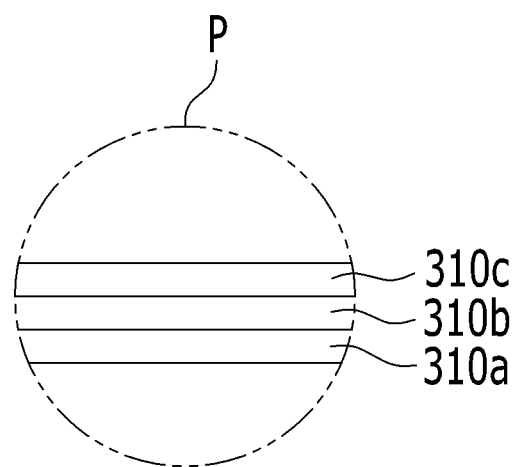

[FIG. 5]
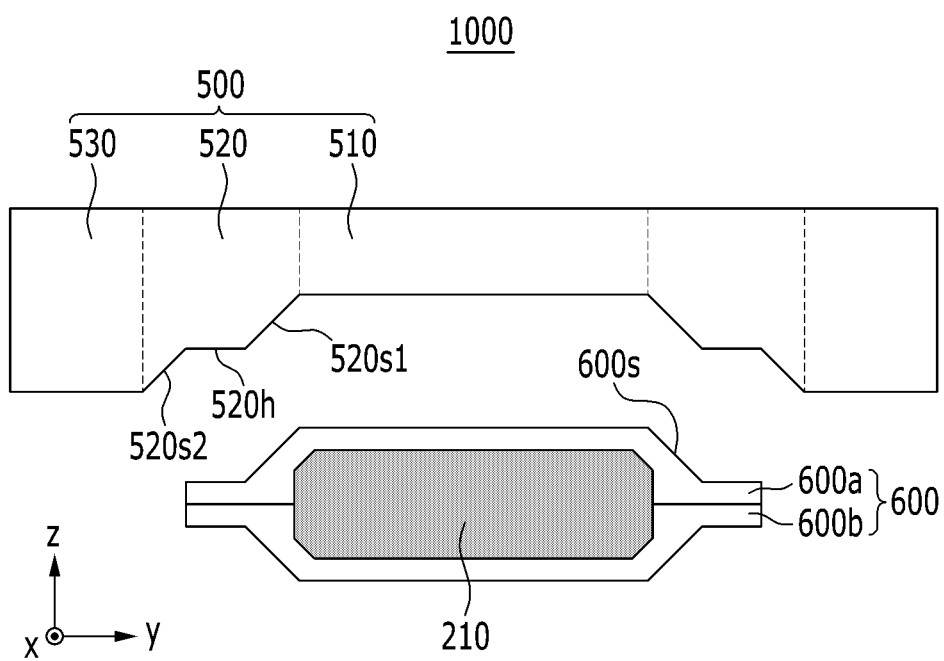

[FIG. 6]
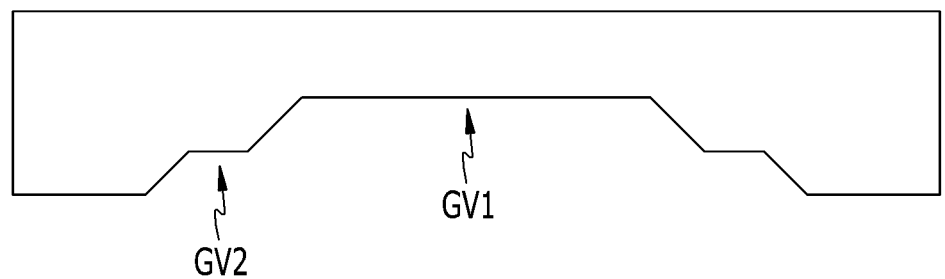
[FIG. 7]
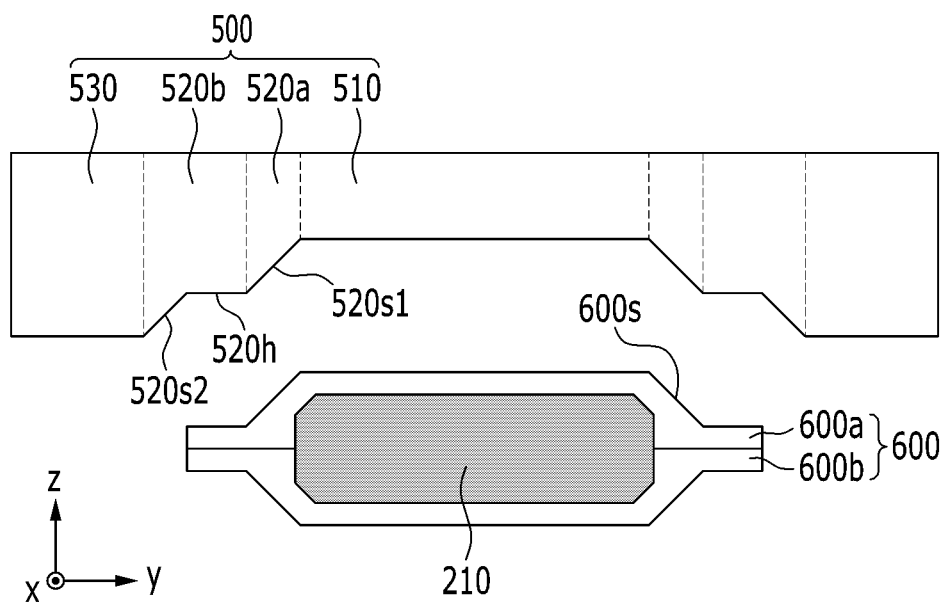

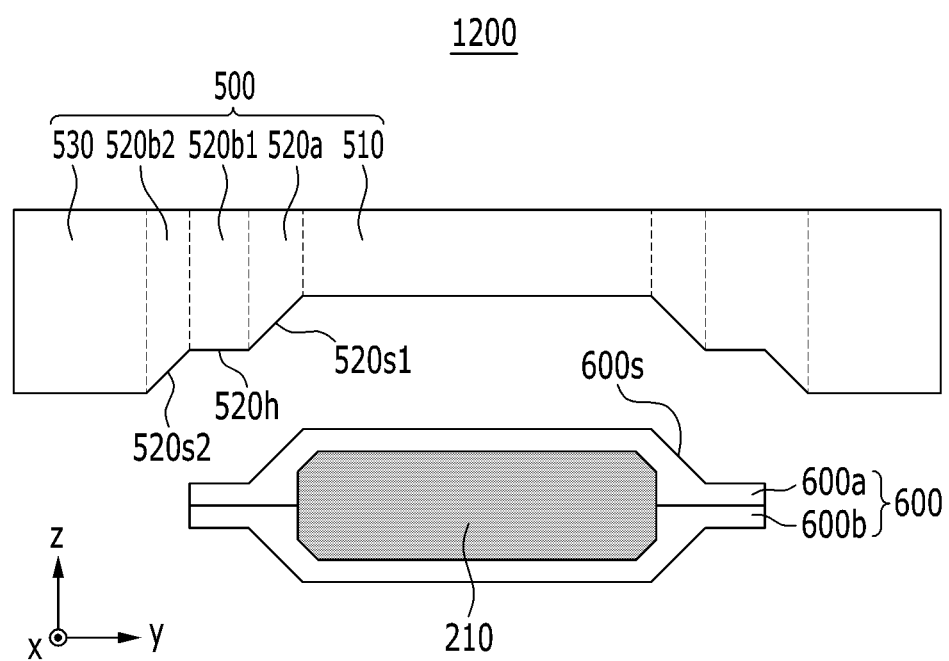
[FIG. 8]

[FIG. 9]
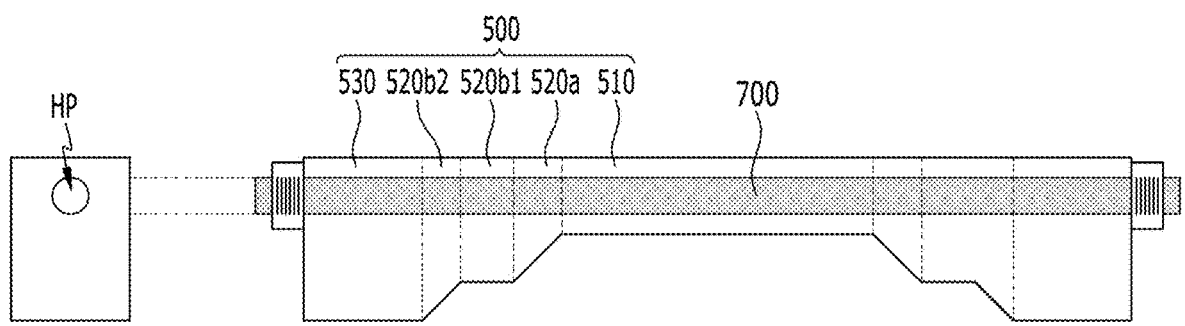

[FIG. 10]
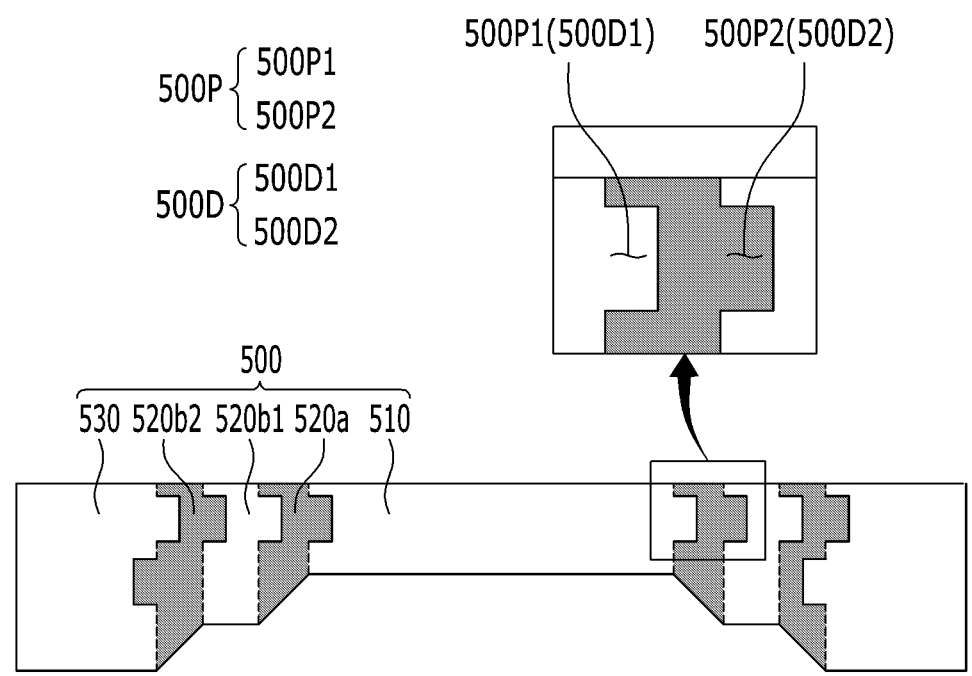

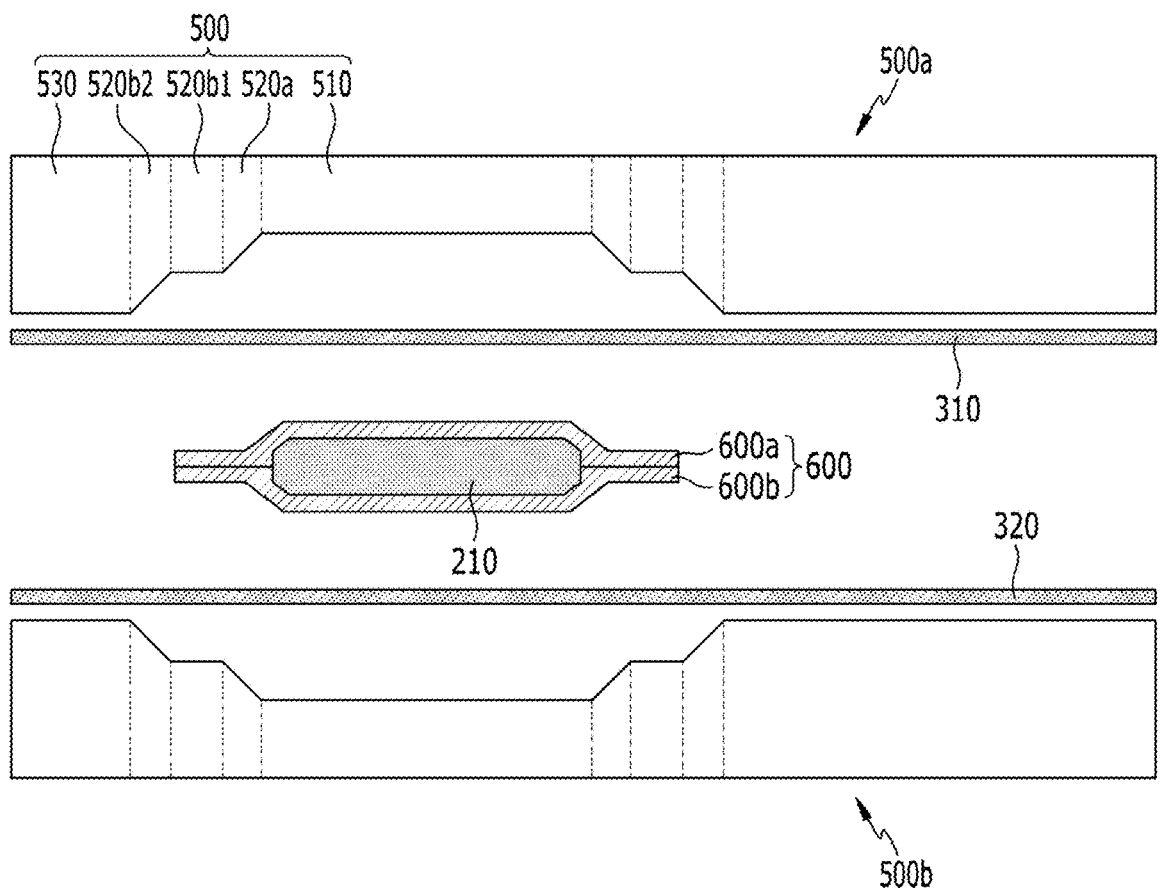

[FIG. 12]
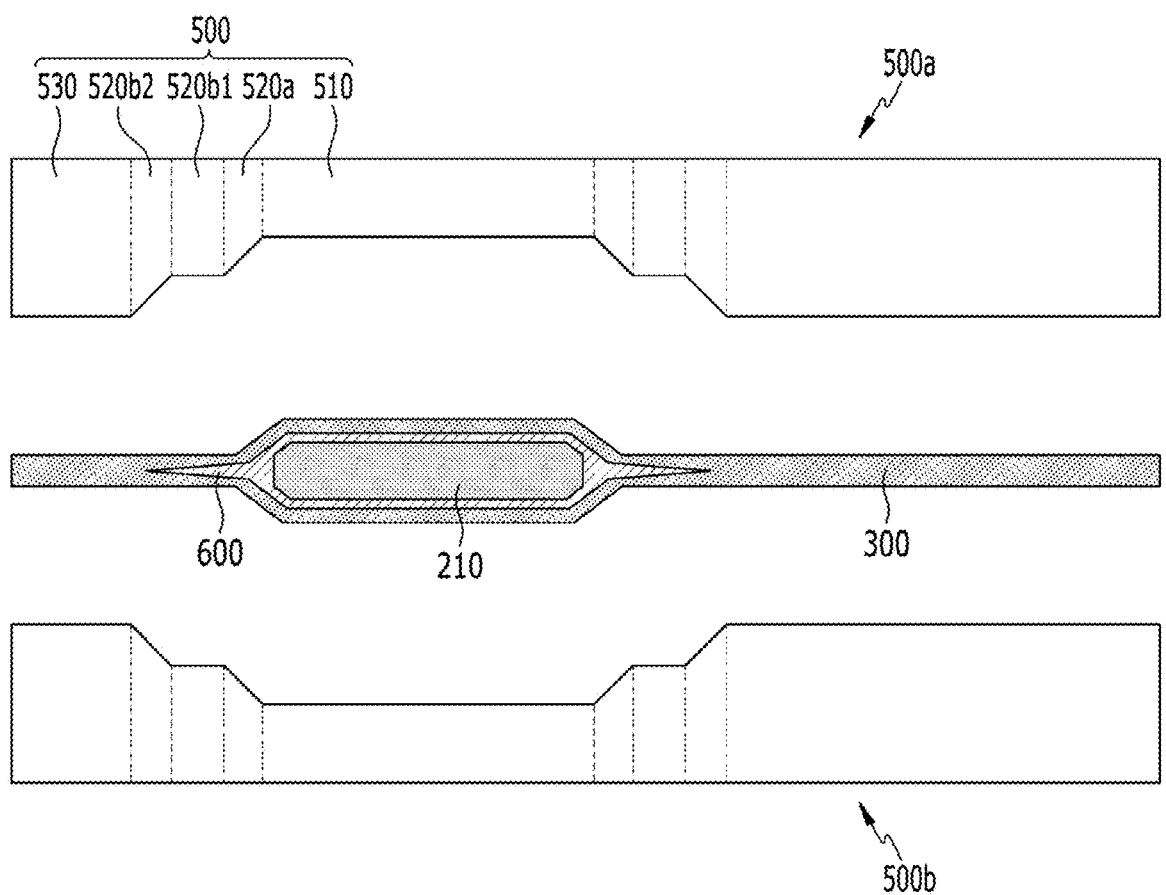

APPARATUS FOR MANUFACTURING POUCH TYPE BATTERY

CROSS REFERENCE TO RELATED APPLICATIONS

This application is a national phase entry under 35 U.S.C. § 371 of International Application No. PCT/KR2021/011912, filed on Sep. 3, 2021, published in Korean, which claims the benefit of priority to Korean Patent Application No. 10-2020-0141978 filed on Oct. 29, 2020, the disclosures of which are hereby incorporated by reference herein in their entireties.

TECHNICAL FIELD

The present disclosure relates to a pouch type battery manufacturing apparatus, and more particularly, to a pouch type battery manufacturing apparatus having a modularized sealing tool.

BACKGROUND

As the demands for portable electronic products such as notebooks, video cameras and cellular phones are rapidly increased in these days, and development of electric vehicles, energy storage batteries, robots, satellites, etc. is under active progress, numerous studies are being made on secondary batteries being used as the driving power source.

The electrode assembly mounted in the battery case is a power generating element, having a cathode/separator/anode stack structure, which can be charged and discharged, and the electrode assembly is classified into a jelly-roll type, a stacked type and a stacked/folded type. The jelly-roll type electrode assembly is configured to have a structure in which a long sheet type cathode and a long sheet type anode, to which active materials are applied, are wound in a state where a separator is interposed between the cathode and the anode, the stacked type electrode assembly is configured to have a structure in which a large number of cathodes having a predetermined size and a large number of anodes having a predetermined size are sequentially stacked in a state in which separators are interposed between the cathodes and the anodes, and the stacked/folded type electrode assembly is a combination of the jelly-roll type electrode assembly and the stacked type electrode assembly. Among them, the jelly-roll type electrode assembly has advantages in that manufacturing is easy and an energy density per unit weight is high.

Meanwhile, based on the shape of a battery case, a secondary battery is classified into a cylindrical battery where an electrode assembly is built into a cylindrical metal can, a prismatic battery where an electrode assembly is built into a prismatic metal can, and a pouch-type battery where an electrode assembly is built into a pouch type case formed of an aluminum laminate sheet.

A pouch type secondary battery includes an electrode assembly in which an electrode and a separator are alternately laminated, and a pouch case for housing the electrode assembly. The method for manufacturing the secondary battery includes an electrode production step of producing an electrode, an electrode assembly production step of alternately laminating electrodes and a separator to produce an electrode assembly, an electrode lead coupling step of coupling electrode lead to the electrode assembly, and a pouch sealing step of housing the electrode assembly in a pouch case in a state where the tip of the electrode lead is drawn out to the outside, and sealing the edge surface of the pouch case.

Here, the pouch sealing step can be performed by sealing the edge surface of the pouch case using a sealing device including an upper tool and a lower tool.

However, the sealing device can stably seal the edge surface of the pouch case without an electrode lead, but the edge surface of the pouch case having the electrode lead has a problem that a sealing defect occurs due to the drawing of the electrode lead.

In particular, the width, thickness, and position of the electrode lead may differ depending on the capacity of the secondary battery, the design of the secondary battery, the material of the electrode lead, and the sales company, and therefore, there is a problem that a new sealing device needs to be manufactured every time when the width, thickness, and position of the electrode lead are changed.

DETAILED DESCRIPTION OF THE INVENTION

Technical Problem

It is an object of the present disclosure to provide a pouch type battery manufacturing apparatus having a modularized sealing tool.

However, the problem to be solved by embodiments of the present disclosure is not limited to the above-described problems, and can be variously expanded within the scope of the technical idea included in the present disclosure.

Technical Solution

According to an embodiment of the present disclosure, there is provided A pouch type battery manufacturing apparatus, which is a secondary battery manufacturing apparatus for sealing a pouch type battery case, the apparatus comprising: an upper sealing tool and a lower sealing tool, wherein each of the upper sealing tool and the lower sealing tool is formed by assembling a plurality of sealing parts, wherein the plurality of sealing parts comprises a central sealing part, a first sealing part located on the left and right sides of the central sealing part, and a second sealing part disposed outside the first sealing part, and wherein the central sealing part corresponds to an electrode lead covered by a lead film, and an upper surface and a lower surface of the central sealing part are parallel to each other.

One of the upper surface and the lower surface of the first sealing part may have two inclined surfaces and a horizontal surface connecting the two inclined surfaces.

The first sealing part comprises a 1-1 sealing part connected to the central sealing part, and a 1-2 sealing part located outside the 1-1 sealing part and assembled with the 1-1 sealing part, and one of the upper surface and the lower surface of the 1-1 sealing part has one inclined surface, and one of the upper surface and the lower surface of the 1-2 sealing part may have a horizontal surface connected to the inclined surface of the 1-1 sealing part, and an inclined surface connected to the horizontal surface of the 1-2 sealing part.

The 1-2 sealing part may be a form in which two sealing parts are assembled.

The inclined surface of the 1-1 sealing part may correspond to an inclined portion of the lead film.

The inclined portion of the lead film corresponds to an edge in the width direction of the electrode lead, and the edge in the width direction of the electrode lead may have a tapered shape.

The lead film comprises an upper lead film and a lower lead film, and the 1-2 sealing part may correspond to a portion in which the upper lead film and the lower lead film are sealed in a horizontal direction.

The pouch type battery manufacturing apparatus comprises an upper case and a lower case of the pouch type battery case, wherein the second sealing part may correspond to a portion in which the upper case and the lower case are sealed in a horizontal direction.

The plurality of sealing parts are disposed along a horizontal direction, a hole part formed along a horizontal direction is formed in each of the plurality of sealing parts, and the plurality of sealing parts may be coupled by a fixing member passing through the hole parts.

At least one of a protrusion and a groove is formed in each of the plurality of sealing parts, and the protrusion of the sealing part is coupled to the groove of the adjacent sealing part and thus, the sealing parts are coupled to each other.

A direction in which the protrusion and the groove may be formed is the same as the direction in which the sealing parts are assembled.

The plurality of sealing parts is decreased in thickness toward the central part of the upper sealing tool and the lower sealing tool, and at least two of the plurality of sealing parts may be formed with a groove toward the central part of the upper sealing tool and the lower sealing tool.

The plurality of sealing parts may be formed in symmetrical shapes with respect to the center of the upper sealing tool and the lower sealing tool.

Advantageous Effects

According to embodiments of the present disclosure, the respective modules constituting the sealing tool can be manufactured to have various thicknesses, widths, angles and the like, and thus, the manufactured modules can be assembled as desired to form a sealing tool. By implementing a module-type sealing tool divided into a plurality of sections in this way, it is possible to prevent unnecessary mold production and quickly cope with diversification of design.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view showing a pouch type battery cell according to an embodiment of the present disclosure;

FIG. 2 is a perspective view showing a state in which the pouch type battery cell of FIG. 1 is assembled;

FIG. 3 is a cross-sectional view taken along the cutting line A-A' of FIG. 2;

FIG. 4 is an enlarged cross-sectional view of the region P of FIG. 3;

FIG. 5 is a view showing a pouch type battery manufacturing apparatus according to an embodiment of the present disclosure;

FIG. 6 is a view showing a pouch type battery manufacturing apparatus according to a comparative example of the present disclosure;

FIG. 7 is a view showing a pouch type battery manufacturing apparatus according to another embodiment of the present disclosure;

FIG. 8 is a view showing a pouch type battery manufacturing apparatus according to another embodiment of the present disclosure;

FIG. 9 is a view showing a method of coupling a plurality of sealing parts constituting The pouch type battery manufacturing apparatus according to an embodiment of the present disclosure;

FIG. 10 is a view showing a method of coupling a plurality of sealing parts constituting the pouch type battery manufacturing apparatus according to another embodiment of the present disclosure;

FIG. 11 is a view showing a pouch type battery before sealing using the pouch type battery manufacturing apparatus according to an embodiment of the present disclosure; and FIG. 12 is a view showing a pouch type battery after sealing using the pouch type battery manufacturing apparatus of FIG. 11.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is an exploded perspective view showing a pouch type battery cell according to an embodiment of the present disclosure. FIG. 2 is a perspective view showing a state in which the pouch type battery cell of FIG. 1 is assembled. FIG. 3 is a cross-sectional view taken along the cutting line A-A' of FIG. 2. FIG. 4 is an enlarged cross-sectional view of the region P of FIG. 3.

Referring to FIGS. 1 to 3, the pouch type battery cell 100 according to the present embodiment can be manufactured by housing an electrode assembly 200 inside a pouch case 300 and then sealing the case. The electrode assembly 200 may include a cathode, an anode, and a separator disposed between the cathode and the anode. The electrode assembly 200 may be a stack type electrode assembly, a jelly-roll type electrode assembly, or a stack/folding type electrode assembly.

Each of the cathode and the anode includes an electrode tab 210t, and the electrode leads 210 and 220 each connected to the electrode tab 210t may be exposed to the outside of the pouch case 300. In addition, the electrode leads 210 and 220 can be located respectively in the sealing part 300S in a state of being covered with a lead film 600 so as to secure a sealing property and an insulation property.

The pouch case 300 is composed of a laminate sheet, and may include a resin layer for heat fusion and a metal layer for preventing material penetration. The pouch case 300 may include an upper case 310 and a lower case 320.

Specifically, referring to FIG. 4, the upper case 310 may include an inside resin layer 310a for sealing, a metal layer 310b for preventing material penetration, and an outside resin layer 310c.

The layer structure concerning the upper case 310 described above may be equally applied even to a lower case 320. In other words, the lower case 320 may include an inside resin layer, a metal layer and an outside resin layer along a direction away from the electrode assembly 200.

The outside resin layer 310c and the packaging sheet layer can have excellent tensile strength and weather resistance compared to their thickness and have electrical insulation property in order to protect the pouch type secondary battery from the outside. The outside resin layer 310c may include a polyethylene terephthalate (PET) resin or a nylon resin. The metal layer 310b can prevent air, moisture and the like from flowing into the pouch type battery layer 100. The metal layer 310b may include aluminum (Al). The inside resin layer 310a can be heat-fused to each other by heat and pressure applied in a state where the electrode assembly 200 is built-in. The inside resin layer 310a may include casted polypropylene (CPP) or polypropylene (PP).

Referring back to FIGS. 1 to 3, a concave-shaped housing part 300ST on which the electrode assembly 200 can be seated may be formed in each of the upper case 310 and the lower case 320. Sealing parts 300S1 and 300S2 may be provided along the outer periphery of the housing part 300ST for each of the upper case 310 and the lower case 320. The sealing part 300S1 of the upper case 310 and the sealing part 300S2 of the lower case 320 can be heat-fused to each other to form the sealing part 300S and seal the pouch case 300.

In another embodiment of the present disclosure, one side of the upper case and one side of the lower case can be integrally connected to each other, and the remaining three sides can be heat-fused.

On the other hand, each of the plurality of cathodes and the plurality of anodes included in the electrode assembly 200 may include a cathode tab and an anode tab, to which electrode leads 210 and 220 are connected. Specifically, one of the electrode leads 210 and 220 may be a cathode lead, and the other may be an anode lead. As described above, one of the electrode leads 210 and 220 connected to the electrode assembly 200 can protrude from one end part of the pouch case 300 and be exposed to the outside of the pouch case 300, and the other of the electrode leads 210 and 220 can protrude from the other one end part of the cell case 300 and be exposed to the outside of the cell case 300. In the present embodiment, the structure of the bidirectional electrode leads 210 and 220 has been described, but the electrode leads 210 and 220 can also be protruded in one direction.

FIG. 5 is a view showing a pouch type battery manufacturing apparatus according to an embodiment of the present disclosure.

Referring to FIG. 5, a pouch type battery manufacturing apparatus 1000 according to the present embodiment includes a sealing tool 500 formed by assembling a plurality of sealing parts. The sealing tool 500 may include an upper sealing tool and a lower sealing tool. Here, the upper sealing tool will be mainly described. The lower sealing tool has the same configuration as the upper sealing tool, and in order to seal the pouch type battery case, the upper sealing tool and the lower sealing tool can be disposed so as to face the pouch-type battery, respectively.

The plurality of sealing parts according to the present embodiment comprises a central sealing part 510, a first sealing part 520 located on the left and right sides of the central sealing part 510, and a second sealing part 530 disposed outside the first sealing part 520. The central sealing part 510, the first sealing part 520, and the second sealing part 530 can be assembled and coupled, or separated adjacent to each other.

The pouch type battery manufacturing apparatus shown in FIG. 5 may form the sealing part 300S shown along the y-axis direction of FIG. 2. In other words, the pouch type battery manufacturing apparatus of FIG. 5 is a view seen in the x direction of FIG. 3. The central sealing part 510 corresponds to the electrode lead 210 covered by the lead film 600, and an upper surface and a lower surface of the central sealing part 510 are parallel to each other. The upper surface of the first sealing part 520 has a horizontal surface parallel to the upper surface of the central sealing part 510, and a lower surface of the first sealing part 520 may have two inclined surfaces 520s1 and 520s2 and a horizontal surface 520h for connecting the two inclined surfaces 520s1 and 520s2.

Referring to FIGS. 3 and 5, the first inclined surface 520s1 of the first sealing part 520 may correspond to an inclined portion 600s of the lead film 600. The inclined portion 600s of the lead film 600 may correspond to an edge in the width direction of the electrode lead 210. Here, the width direction of the electrode lead 210 may refer to a direction that is perpendicular to a direction in which the electrode lead 210 protrudes from the electrode assembly 200 and is parallel to a surface on which the sealing part 300S is formed. The edge in the width direction of the electrode lead 210 may have a tapered shape. The left and right edge parts of the electrode lead 210 can be designed so as to have a tapered shape, thereby improving the adhesiveness of the edge part of the electrode lead 210.

The lead film 600 according to the present embodiment includes an upper lead film 600a and a lower lead film 600b, and the horizontal surface 520h of the first sealing part 520 may correspond to a portion in which the upper lead film 600a and the lower lead film 600b are sealed in a horizontal direction.

The second sealing part 530 according to the present embodiment may be disposed on the outermost part and may be assembled and coupled to the first sealing part 520.

FIG. 6 is a view showing a pouch type battery manufacturing apparatus according to a comparative example of the present disclosure.

Referring to FIG. 6, The pouch type battery manufacturing apparatus according to the comparative example may have a sealing tool 10 having a first groove GV1 and a second groove GV2 through mold processing. That is, the sealing tool 10 according to the comparative example may be integrally formed by designing the width and depth of the groove according to the target sealing thickness and the dimensions of the electrode lead and the lead film. According to this, the thickness and width can be applied only to a single standard sealing which was originally designed, and if the design standard is changed, a new sealing tool must be manufactured to match it. On the other hand, since the sealing tool according to the present embodiment is a sealing tool 500 formed by assembling a plurality of sealing parts, each sealing part constituting the sealing tool can be manufactured to have various thicknesses, widths, angles and the like, and thus, the manufactured sealing parts can be assembled as desired to form a sealing tool.

FIG. 7 is a view showing a pouch type battery manufacturing apparatus according to another embodiment of the present disclosure.

Referring to FIG. 7, in the pouch type battery manufacturing apparatus 1100 according to the present embodiment, the first sealing part 520 of FIG. 5 includes a 1-1 sealing part 520a connected to the central sealing part 510, and a 1-2 sealing part 520b located outside the 1-1 sealing part 520a and assembled with the 1-1 sealing part 520a. At this time, the lower surface of the 1-1 sealing part 520a has one inclined surface 520s1, and the lower surface of the 1-2 sealing part 520b has a horizontal surface 520h connected to the inclined surface 520s1 of the 1-1 sealing part (520a), and an inclined surface 520s2 connected to the horizontal surface 520h of the 1-2 sealing part 520b. The horizontal surface 520h of the 1-2 sealing part 520b according to the present embodiment may correspond to a portion in which the upper lead film 600a and the lower lead film 600b are sealed in a horizontal direction.

In addition to the differences described above, all the contents described in the embodiment of FIG. 5 can be applied to the present embodiment.

FIG. 8 is a view showing a pouch type battery manufacturing apparatus according to another embodiment of the present disclosure.

Referring to FIG. 8, in the pouch type battery manufacturing apparatus 1200 according to the present embodiment, the 1-2 sealing part 520b of FIG. 7 may be a form in which two sealing parts 520b1 and 520b2 are assembled. Specifically, the 1-2 sealing part 520b of FIG. 7 includes a 1-2-1 sealing part 520b1 connected to the 1-1 sealing part 520a, and a 1-2-2 sealing part 520b2 located outside the 1-2-1 sealing part 520b1 and assembled with the 1-2-1 sealing part 520b1. At this time, the lower surface of the 1-2-1 sealing part 520b1 has a horizontal surface 520h connected to the inclined surface 520s1 of the 1-1 sealing part 520a, and the lower surface of the 1-2-2 sealing part 520b2 may have an inclined surface 520s2 connected to the horizontal surface 520h of the 1-2-1 sealing part 520b1. The horizontal surface 520h of the 1-2-1 sealing part 520b1 according to the present embodiment may correspond to a portion in which the upper lead film 600a and the lower lead film 600b are sealed in a horizontal direction.

In addition to the differences described above, all the contents described in the embodiment of FIG. 7 can be applied to the present embodiment.

FIG. 9 is a view showing a method of coupling a plurality of sealing parts constituting the pouch type battery manufacturing apparatus according to an embodiment of the present disclosure.

Referring to FIG. 9, a plurality of sealing parts 510, 520a, 520b1, 520b2 and 530 constituting the sealing tool 500 according to the present embodiment are disposed along the horizontal direction, and a hole part HP formed along a horizontal direction is formed in each of the plurality of sealing parts 510, 520a, 520b1, 520b2 and 530. The plurality of sealing parts 510, 520a, 520b1, 520b2 and 530 can be coupled to each other by a fixing member 700 passing through the hole parts HP. The fixing member 700 can be fixed on both sides of the sealing tool 500 by a bolt/nut method.

FIG. 10 is a view showing a method of coupling a plurality of sealing parts constituting the pouch type battery manufacturing apparatus according to another embodiment of the present disclosure.

Referring to FIG. 10, at least one of a protrusion 500P and a groove 500D is formed in each of the plurality of sealing parts 510, 520a, 520b1, 520b2 and 530. As shown in FIG. 10, the protrusion 500P1 of the central sealing part 510 may be inserted into and fixed to a recessed part 500D1 of the 1-1 sealing part 520a. Similarly, the protrusion 500P2 of the 1-1 sealing part 520a can be inserted into and fixed to the recessed part 500D2 of the 1-2-1 sealing part 520b1. In this manner, the protrusion of the sealing part can be coupled to the groove of the adjacent sealing part, so that the plurality of sealing parts 510, 520a, 520b1, 520b2 and 530 can be coupled to each other. The outermost shape of the protrusion 500P and the groove 500D may be variously applied so as to include a locally small radius of curvature and/or edge, such as a spherical shape, a prismatic shape, or a cylindrical shape.

According to the present embodiment, the direction in which the protrusion 500P and the groove 500D are formed may be the same as the direction in which the sealing parts 510, 520a, 520b1, 520b2 and 530 are assembled.

FIG. 11 is a view showing a pouch type battery before sealing using the pouch type battery manufacturing apparatus according to an embodiment of the present disclosure. FIG. 12 is a view showing a pouch type battery after sealing using the pouch type battery manufacturing apparatus of FIG. 11.

Referring to FIG. 11, an upper case 310 and a lower case 320 may be disposed on the upper and lower parts of the electrode lead 210 wrapped with the lead film 600, respectively. Then, the upper sealing tool 500a is disposed on the upper part of the upper case 310, the lower sealing tool 500b is disposed on the lower part of the lower case 320, and then the upper sealing tool 500a and the lower sealing tool 500b are pressed to seal the pouch case 300, the lead film 600, and the like as shown in FIG. 12, thereby realizing the packaging of the pouch type secondary battery. In the present embodiment, the plurality of sealing parts are decreased in thickness toward the central part of the upper sealing tool 500a and the lower sealing tool 500b, and at least two of the plurality of sealing parts may be formed with a groove toward the center of the upper sealing tool 500a and the lower sealing tool 500b. In addition, the plurality of sealing parts may be formed in symmetrical shapes with respect to the center of the upper sealing tool 500a and the lower sealing tool 500b.

Although preferred embodiments of the present disclosure have been described above, the scope of the present disclosure is not limited thereto, and numerous other variations and modifications can be made by those skilled in the art using the principles of the invention defined in the appended claims, which also fall within the spirit and scope of the present disclosure.

DESCRIPTION OF REFERENCE NUMERALS

500: sealing tool
500P: protrusion
500D: recessed part
510: central sealing part
520: first sealing part
530: second sealing part
600: lead film
700: fixing member

The invention claimed is:

1. A manufacturing apparatus for sealing a pouch type battery case of a secondary battery, the manufacturing apparatus comprising:
   an upper sealing tool and a lower sealing tool,
   wherein each of the upper sealing tool and the lower sealing tool comprises a plurality of assembled sealing parts,
   wherein each plurality of sealing parts comprises a central sealing part, a first sealing part located on left and right opposite sides of the central sealing part, and a second sealing part located on left and right opposite sides of the first sealing part,
   wherein the central sealing part is configured to press an electrode lead covered by a lead film, and an upper surface and a lower surface of the central sealing part are parallel to each other, and
   wherein one of the upper surface or the lower surface of each first sealing part has two inclined surfaces and a horizontal surface connecting the two inclined surfaces.

2. The manufacturing apparatus according to claim 1, wherein:
   the first sealing part comprises a 1-1 sealing part connected to the central sealing part, and a 1-2 sealing part located on left and right opposite sides of the 1-1 sealing part and assembled with the 1-1 sealing part, and
   one of the upper surface or the lower surface of the 1-1 sealing part has one inclined surface, and one of the upper surface or the lower surface of the 1-2 sealing part has a horizontal surface connected to the inclined surface of the 1-1 sealing part and an inclined surface connected to the horizontal surface of the 1-2 sealing part.

3. The manufacturing apparatus according to claim 2, wherein the 1-2 sealing part comprises two assembled sealing parts.

4. The manufacturing apparatus according to claim 2, wherein the inclined surface of the 1-1 sealing part is configured to press an inclined portion of the lead film.

5. The manufacturing apparatus according to claim 4, wherein the inclined portion of the lead film overlies an edge of the electrode lead in a width direction of the electrode lead, and the edge has a tapered shape in the width direction.

6. The manufacturing apparatus according to claim 2, wherein the lead film comprises an upper lead film and a lower lead film, and the 1-2 sealing part is configured to press a portion of the lead film in which the upper lead film and the lower lead film are directly sealed to one another.

7. The manufacturing apparatus according to claim 2, wherein the pouch type battery case comprises an upper case and a lower case, and
   wherein the second sealing part is configured to press a portion of the pouch type battery case in which the upper case and the lower case are directly sealed to one another.

8. A manufacturing apparatus for sealing a pouch type battery case of a secondary battery, the manufacturing apparatus comprising:
   an upper sealing tool and a lower sealing tool,
   wherein each of the upper sealing tool and the lower sealing tool comprises a plurality of assembled sealing parts,
   wherein each plurality of sealing parts comprises a central sealing part, a first sealing part located on left and right opposite sides of the central sealing part, and a second sealing part located on left and right opposite sides of the first sealing part,
   wherein the central sealing part is configured to press an electrode lead covered by a lead film, and an upper surface and a lower surface of the central sealing part are parallel to each other,
   wherein within each plurality of assembled sealing parts, the central sealing part, the first sealing part, and the second sealing part are disposed adjacent to one another along a horizontal direction and each have a hole part extending along the horizontal direction, and
   wherein within each plurality of assembled sealing parts, the central sealing part, the first sealing part, and the second sealing part are coupled together by a respective fixing member passing through each of the hole parts.

9. A manufacturing apparatus for sealing a pouch type battery case of a secondary battery, the manufacturing apparatus comprising:
   an upper sealing tool and a lower sealing tool,
   wherein each of the upper sealing tool and the lower sealing tool comprises a plurality of assembled sealing parts,
   wherein each plurality of sealing parts comprises a central sealing part, a first sealing part located on left and right opposite sides of the central sealing part, and a second sealing part located on left and right opposite sides of the first sealing part,
   wherein the central sealing part is configured to press an electrode lead covered by a lead film, and an upper surface and a lower surface of the central sealing part are parallel to each other, and
   wherein within each plurality of assembled sealing parts, at least one of a protrusion and a groove is formed in each of the central sealing part, the first sealing part, and the second sealing part, each protrusion being inserted into and fixed to a corresponding one of the grooves of an adjacent one of the respective plurality of assembled sealing parts and thus, the sealing parts within each plurality of assembled sealing parts are interlocked with each other.

10. The manufacturing apparatus according to claim 9, wherein a direction in which each protrusion and the corresponding one of the grooves extend is the same as a coupling direction in which the respective sealing parts within each plurality of assembled sealing parts are assembled.

11. The manufacturing apparatus according to claim 1, wherein:
    each plurality of assembled sealing parts decreases in thickness from the second sealing part toward the central sealing part, and
    at least two of the plurality of sealing parts within each plurality of sealing parts have a groove extending toward the respective central sealing part.

12. The manufacturing apparatus according to claim 1, wherein the first sealing part and the second sealing part of each plurality of assembled sealing parts have symmetrical shapes with respect to a center of the respective central sealing part.

* * * * *